May 7, 1935.  G. L. KOTHNY ET AL  2,000,524
WELL SURVEYING INSTRUMENT
Filed June 13, 1933    2 Sheets-Sheet 2

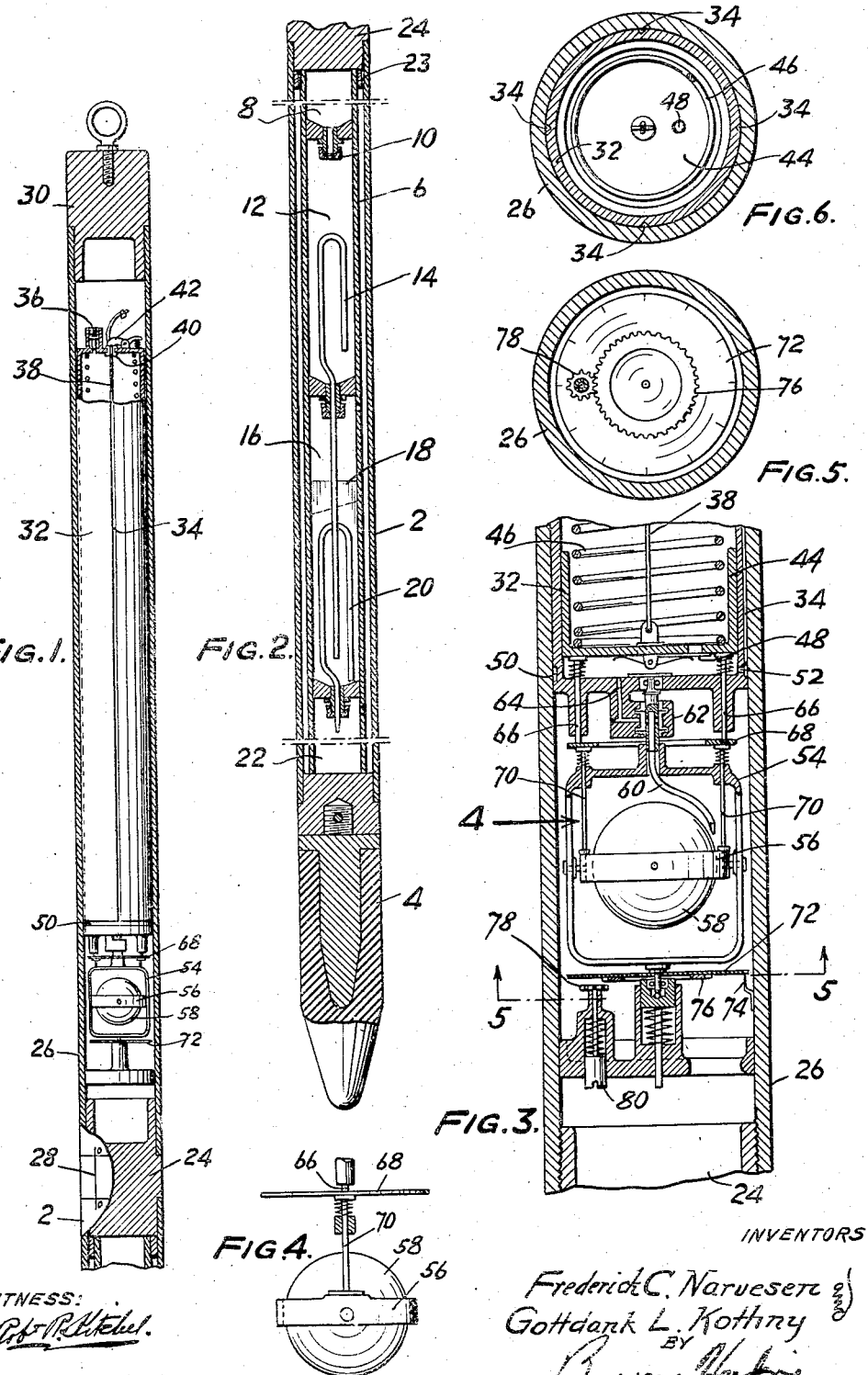

WITNESS:

INVENTORS
Frederick C. Narvesen
Gottdank L. Kothny
BY
ATTORNEYS.

Patented May 7, 1935

2,000,524

UNITED STATES PATENT OFFICE 2,000,524

WELL SURVEYING INSTRUMENT

Gottdank L. Kothny, Strafford, Pa., and Frederick C. Narvesen, East Rockaway, Long Island, N. Y., assignors to Sperry-Sun Well Surveying Company, Philadelphia, Pa., a corporation of Delaware Application June 13, 1933, Serial No. 675,568

10 Claims. (Cl. 33—205)

This invention relates to a well surveying instrument and particularly to a gyroscopic arrangement to be used in connection with an inclination indicating means capable of insertion within an opening of very small diameter.

In an application of William E. Winn, Serial Number 391,723, filed September 11, 1929, there is disclosed a well surveying instrument of very satisfactory type which indicates the deviations of a bore hole from the vertical, this instrument being designed in its commercial application for the making of a single reading at a predetermined depth within a bore hole. The direction of inclination in azimuth as well as the amount of inclination is frequently of importance. In said Winn application there is disclosed in combination with this instrument the use of a magnetic needle which is clamped in position at the time an inclination reading is made so that the direction of the inclination may be determined. In the surveying of wells, however, the magnetic needle is somewhat unreliable and also objectionable in the requirements it imposes on the instrument. The unreliability is due to the fact that other magnetic fields than the principal field of the earth may be encountered within the bore hole due, for example, to the presence of magnetic ores. It is practically impossible to determine where such deposits may occur so that the reading of the instrument is necessarily taken at its face value and may be considerably in error. Furthermore, surveying is conveniently carried out, particularly with the siphonic instrument described in the Winn application, either within a cased bore hole or within a steel drill stem. In either of these instances the indications of a magnetic needle are substantially worthless. In any event, if a magnetic needle is used the portions of the instrument adjacent the same which might affect it must necessarily be of non-magnetic material which practically requires them to be of brass.

The ideal direction means for a well surveying instrument is the gyroscope by reason of its indifference to the presence of magnetic fields. The gyroscope, however, as usually constructed, has a practical minimum size which renders it unsuited for a well surveying instrument if the instrument is to be of such small diameter that it will pass within a drill stem. It is generally impractical to run from the surface power supply lines to drive an induction or synchronous gyroscope motor or even a direct current gyroscope motor. This requires for a practical electrical gyroscope that it be driven by direct current supplied by batteries located within the instrument casing. A direct current gyroscope motor involves commutation problems and requires a high voltage battery necessitating the use of a relatively large number of cells which occupy considerable space. Furthermore, an electrical gyroscope cannot be made sufficiently small in size to be located within an instrument designed to enter a small drill stem.

It is the broad object of the present invention to provide a gyroscopic directing indicating means in a well surveying instrument which may be of such small size that the instrument will be able to pass within a small size drill stem. The gyroscope furthermore is so designed that the instrument may be used in the "go-devil" fashion, being dropped inside a drill stem and recovered when the drill stem is pulled to the surface. In a preferred form of the invention the gyroscope is driven by the action of a jet of air or other gas, either being spun to full speed before the instrument is lowered whereupon it will continue to rotate by reason of its own momentum until the reading is completed, or alternatively being continuously driven by a jet of air or gas throughout the entire well surveying operation.

The gyroscopic device is particularly adapted for use in conjunction with the siphonic type of well surveying instrument referred to above, this instrument being inherently of very small diameter and thus adapted for lowering within a drill stem or very small bore hole.

A further desirable characteristic of an instrument from the practical standpoint is that it should be fairly inexpensive because of the danger of loss of the instrument by the breaking of a cable or its being caught somewhere within the bore hole. In accordance with the present invention the gyroscope required is relatively inexpensive so that the whole instrument is not of such prohibitive cost as will make the possibilities of its loss a serious factor in its use.

The various subsidiary objects of the invention, particularly relating to details of construction, will be apparent from the following description read in conjunction with the accompanying drawings in which:

Fig. 1 is a vertical section through the gyroscopic portion of the instrument;

Fig. 2 is a vertical section in the nature of a continuation of the bottom of Fig. 1 showing the type of siphonic inclination indicating means with which the gyroscope is particularly designed to be assocated;

Fig. 3 is an enlarged vertical section showing details of the gyroscope and its driving and holding mechanisms;

Fig. 4 is a fragmentary view of the clamping arrangement for the gyroscope, the view being taken in the direction indicated by the arrow 4 in Fig. 3;

Fig. 5 is a transverse section taken as indicated by the line 5—5 in Fig. 3;

Fig. 6 is a transverse section through a cylinder for a piston whose descent clamps the gyroscope in position after a predetermined period.

Figure 7:
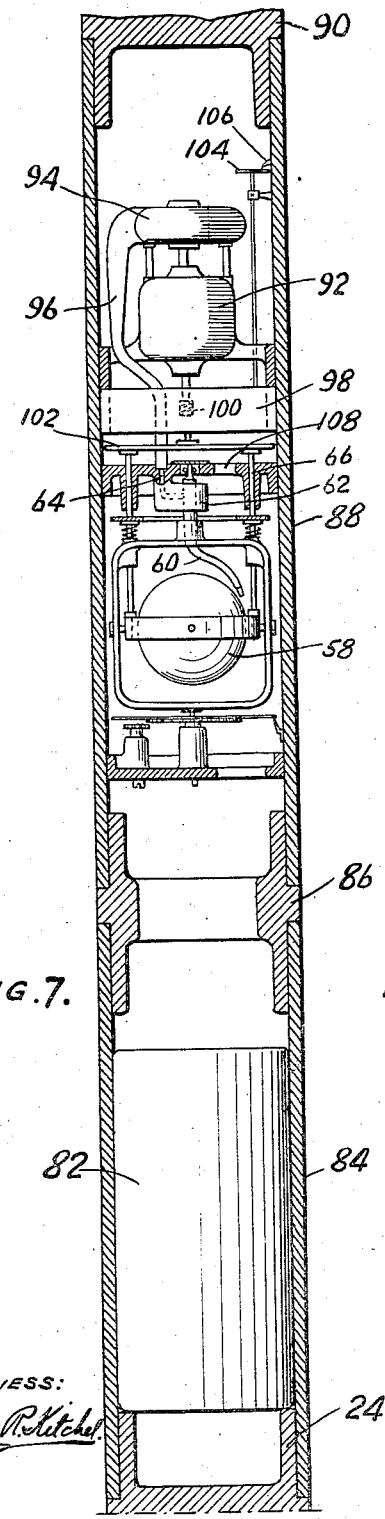
Figs. 7 and 8 are vertical sections showing modified forms of the instrument in accordance with the invention.

Referring first to the modification illustrated in Figs. 1 to 5 inclusive, the inclination recording mechanism, which is illustrated as of the siphonic type forming the subject matter of the Winn application, is contained within a casing 2 closed at its lower end by a resilient shock absorbing nose 4, which casing contains the multipart tubular member 6 in which are located partitions providing an ink reservoir 8 from which the ink supply flows through a restricted orifice 10 into a chamber 12 and is then discharged rapidly after a predetermined period by a siphon 14 into the record chamber 16. Within this record chamber there is located in a predetermined position a record sheet 18 formed by a sheet of paper having a cylindrical form in view of its engagement with the walls of the recording chamber. After the record is made the liquid is discharged from the recording chamber by means of a siphon 20 into a discharge receiving chamber 22. The matter so far described is shown in the Winn application. In accordance with the present invention, the part 2 of the casing is connected by a coupling member 24 with an upper part 26 of the instrument casing which houses the gyroscope and its associated elements. It is important that the parts of the casing be accurately located relatively to each other and for this purpose markings of the type indicated at 28 are provided on the various parts to insure that they are properly assembled prior to the use of the instrument. They may be held fixedly in such position by set screws or any other convenient means.

The upper part 26 of the casing is closed at its upper end by a cap 30 which may be secured to a line whereby the instrument may be lowered within a bore hole for the purpose of making readings. Within the part 26 of the casing there is a cylinder 32 closely fitting the walls of the casing and provided with grooves 34 which provide for the passage of air along the outside of the cylinder. Both the upper and lower ends of the cylinder are substantially closed except for vents which will be referred to hereafter. The upper end of the cylinder is provided with an adjustable needle valve indicated at 36 which may control the flow of air into the cylinder. A bushing 40 in the upper end of the cylinder provides for the passage of a smooth cord indicated at 38 which may be clamped and held against the upper end of the cylinder by means indicated at 42. The lower end of the cord 38, which is preferably of such smooth material as catgut, or the like, so as to prevent substantial leakage at the bushing 40, is connected to a piston 44 sliding within the cylinder 32 and pressed downwardly by a spiral spring 46. The piston is provided with a port normally closed by a downwardly opening spring-pressed check valve indicated at 48.

An annular groove 50 about the lower end of the outside of the cylinder 32 communicates with the grooves 34 and also with the interior of the cylinder below the piston 44 through openings indicated at 52.

A vertical gimbal ring 54 is mounted in the part 26 of the casing by vertically arranged spindles, the lowermost of which is preferably held in an antifriction bearing 55 carried by an upwardly pressed member 57 which thereby serves to maintain it against endwise movements, the spring pressing this bearing upwardly being of such strength as to prevent substantial movement of the gyroscope if the instrument is used in the "go-devil" method. Pivoted in the vertical gimbal 54 is a horizontal gimbal 56 which in turn provides a bearing for a spherical gyroscope rotor 58. The rotor 58 should be as large and as heavy as possible. Because of the restricted space available it is formed of a heavy metal such as lead, the surface of which may be plated by a smooth metal to reduce air friction.

Carried by the vertical gimbal 54 is a nozzle tube 60 arranged to direct a blast of air or other gas approximately tangentially against the periphery of the rotor 58. The rotor 58 may, if desired, be provided with buckets at its portion most distant from the axis of rotation so that it may be more readily driven by the action of the jet of gas issuing from the nozzle 60. However, as will be pointed out later, the supply of gas available is not limited in quantity, so that buckets may be avoided and a smooth surface provided on the rotor which will tend to decrease the retarding effect of the surrounding atmosphere. The time required to bring a smooth rotor up to its proper speed is relatively small so that buckets with their detrimental effects need not be used.

The nozzle 60 receives air or gas from a gland 62 which, in turn, communicates through openings 64 with the cylinder 32 below the piston 44. The arrangement of this gland is such that there is a minimum of friction opposing rotation of the vertical gimbal ring, the gland being preferably formed, as indicated, with labyrinthine passages reducing the leakage of gas while, nevertheless, preventing contact of the relatively rotatable elements.

Plungers 66 urged upwardly by springs carry at their lower ends a ring 68 which is adapted to engage the upper ends of spring-pressed plungers 70 which have flattened lower ends adapted to force to a horizontal position gimbal ring 56. When the piston 44 is lifted from contact with the upper ends of the plungers 66, the springs withdraw the ring 68 from the plungers 70 and also withdraw the plungers 70 from the gimbal ring 56 so that both gimbal rings are free to assume positions as may be determined by the movements of the surveying instrument within a bore hole.

The vertical gimbal ring at its lower end carries an indicating disc 72 markings on which pass adjacent a pointer 74 carried by the casing. The disc 72 carries a gear 76 into mesh with which there may be forced a pinion 78 normally held out of engagement by a spring which moves its spindle downwardly by engaging a head 80, preferably provided with a screw-driver slot into which a screw-driver may be inserted so as to press the pinion 78 into mesh with gear 76 and turn the same to adjust the initial position of the vertical gimbal ring.

In the operation of the device the piston 44 is initially withdrawn from engagement with the plungers so as to free the gimbal rings. By the action of the pinion 78 the disc 72 is then adjusted to bring a proper zero indication adjacent the pointer 74. Following this the piston 44 is permitted to move downwardly so as to clamp both gimbal rings fixedly in position. The plug 30 is then removed from the upper casing and there is connected in its place a suitable hose receiving air from a pump. Air is then introduced and flows through the grooves 34 into the space below the piston 44 and through the passage 64 and gland 62 to the nozzle 60 by which it is directed upon the rotor to rotate the same. The flow of air is continued until the rotor reaches a proper high speed. The supply of air is then discontinued, the connection with the upper end of the casing removed and the cord 38 drawn upwardly to an extent depending upon the time interval desired before the gyroscope is fixed in position. The needle valve 36 will have been previously adjusted to determine the speed of downward travel of the piston during the descent of the instrument into the well.

In the meantime, the prepared siphonic instrument in which ink is slowly flowing into the chamber 12 will be connected and properly aligned with the upper part of the casing. When the time arrives for lowering of the instrument the cord 38 is released so that the piston 44 may begin its downward travel. The cap 30 is then placed upon the casing and the line attached if the instrument is to be lowered on a line.

As the instrument descends within the bore hole the piston 44 is urged downwardly by the spring 46. Its movement, however, is made very slow by the fact that the air beneath the same must pass outwardly through the ports 52 and thence through the grooves 34 and the needle valve 36 within the cylinder above the piston. During this operation little, if any, air will be forced through the nozzle 60, the gyroscope continuing to spin freely because of its initial high speed and antifriction bearings. The parts are so adjusted that at the time the instrument reaches its proper position for the taking of a reading the ink will not yet have entered the record chamber nor will the piston have descended so as to engage the plungers 66. In the meantime, irrespective of movements of the instrument the gyroscope will have maintained the disc 72 in such position that the azimuth of the instrument at the time it rests in the position to take a reading may be determined. This determination is made in the usual fashion taking account of the deviation in azimuth of the disc 72 due to the slope of the instrument which, of course, is found from the siphonic indicator. After the inclination is recorded, during which period the gyroscopic axis will, of course, maintain its position in space substantially fixed since the rotation of the earth in this period will be negligible, the piston 44 will engage the plungers 66 first preventing angular movement of the gimbal ring 54 and will then cause the plungers 70 to engage the gimbal ring 56 bringing this last ring into position at right angles to the axis of the instrument. It is essential that the ring 54 be arrested before movement is imparted to the ring 56 since otherwise the tilting of the rotor due to movement of ring 56 would cause a precession of the ring 54.

The instrument is then brought to the surface and the position of the disc 72 noted. The record sheet 18 is removed and the inclination noted. Since the position of the record paper 18 is known, the relationship of the inclination to the position of the disc 72 may be determined by suitable calculations and there may then be ascertained not only by the amount of the inclination but also its direction in azimuth.

As indicated above, the instrument may be lowered either on a line or within a drill stem, its outer diameter being less than the interior diameter of the pipes forming such stem. In the latter case it is preferably dropped freely within the stem, the resilient nose serving to prevent damage as it engages the joints on the way down. The gyroscope herein illustrated may be so balanced that it will not be harmfully affected in its position by the shocks which may result in the descent.

If the rotor has sufficient inertia and proper antifriction bearings are provided it will continue to spin at a satisfactory rate to maintain direction for a period sufficiently long to enable a proper survey of ordinary wells to be made. In the case of exceptionally deep wells, however, it is desirable to maintain the gyroscope speed by auxiliary means. One method of accomplishing this is illustrated in Fig. 7.

In this case an intermediate section of the casing is provided at 84 carrying batteries 82 which supply the current for the operation of a motor 92. Such battery may be conveniently provided inasmuch as it need only be a low voltage storage battery which may deliver sufficient power by causing the flow of a heavy current. This may be contrasted with a high voltage low current battery necessary for driving a small gyroscope. The battery herein used may be quite small in size since only a few cells need be provided.

The casing section 84 is connected by a coupling 86 to an upper casing section 88 which is closed by a cap 90 similar to that indicated in the previous modification at 30. The sections 84 and 88 are properly lined up as discussed above so that the position of the gyroscope relative to the inclination indicating apparatus connected with the section 84 through the coupling 24 may be determined.

The motor 92 mounted in the casing 88 drives a pump 94 which is shown as of the centrifugal type. This pump delivers air through a passage 96 into the passage 64 communicating with the gland 62 and nozzle 60 as in the previous modification. By the operation of the motor 92 the pump continuously delivers air through the nozzle for the maintenance of the rotor speed. The air from the gyroscope chamber passes upwardly through an opening 108 back to the pump for recirculation.

In order to lock the gimbal rings there is provided a substitute for the plunger 44 in the nature of a timing mechanism indicated at 98 which may be driven by the motor through suitable reduction gearing indicated at 100. By the use of suitable intermediate mechanism a disc 102 may be forced downwardly at the proper time to engage plungers 66 as in the previous modification and thereby lock the gimbal rings. A manually movable shaft may be provided with an indicating disc 104 cooperating with a pointer 106 so that the mechanism 98 may be set to insure a proper interval between the beginning of the surveying operation and the clamping of the gimbal rings.

Figure 8:
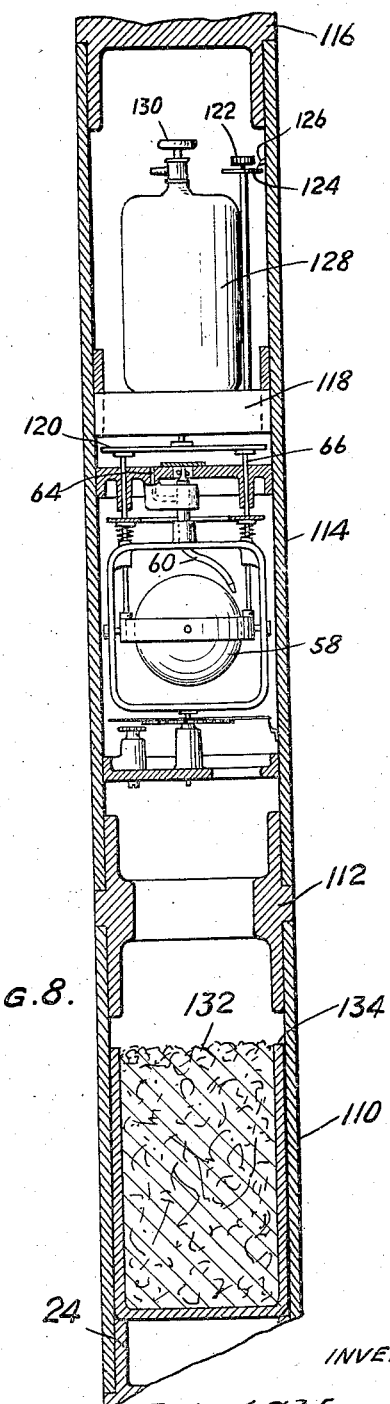

In view of the fact that the casing of the surveying instrument must be completely closed, it is not feasible to provide a supply of air or any other gas under high pressure to drive the gyroscope because a large receiving chamber would be required. However, the gyroscope may be driven if there is provided a supply under pressure of an absorbable gas. A modification involving such arrangement is illustrated in Fig. 8. In this case there are provided above the siphonic instrument casing parts 110 and 114 connected by a coupling 112 and closed by a cap 116. Since there is no motor in this form of device a clockwork mechanism 118 is provided which at the proper time causes a disc 120 to engage the plungers 66 to lock the gimbal rings in position. The clockwork mechanism may be wound by manipulation of a shaft 122, and set to insure a proper interval before locking by turning a disc 124 cooperating with a pointer 126.

Located in the upper portion of the casing is a vessel 128 having an outlet controlled by a valve 130, this vessel containing gas under a suitable high pressure and in amount sufficient to provide for the driving of the gyroscope rotor. Communication between the chamber containing the gas supply 128 and the gyroscope is prevented except through the nozzle 60. By opening the valve to a proper degree a flow of gas is provided through the nozzle to drive the rotor, this gas being absorbed by a suitable material 132 within a vessel 134 carried in the section 110 of the casing. The gas in the vessel 128 may, for example, be carbon dioxide while the absorbent material 132 may be soda-lime. By this arrangement, although a large quantity of gas may pass through the nozzle 60 to drive the rotor 58, nevertheless the pressure in the gyroscope chamber will be maintained low by the continuous absorption of the gas by the material 132.

What we claim and desire to protect by Letters Patent is:

1. In a well surveying instrument provided with means for indicating deviations of the instrument from the vertical, the combination of an element, means for delaying for a predetermined period the operation of the indicating means, a gyroscope connected to the element to insure the location of said element in a determinable azimuthal position during the operation of the indicating means, and means for maintaining the element, after the indicating means operates, in that position which it occupied relatively to the indicating means when the indicating means operated, whereby the azimuth of the deviation may be determined.

2. In a well surveying instrument provided with means for indicating deviations of the instrument from the vertical, the combination of an element, means for delaying for a predetermined period the operation of the indicating means, a gas driven gyroscope connected to the element to insure the location of said element in a determinable azimuthal position during the operation of the indicating means, and means for maintaining the element, after the indicating means operates, in that position which it occupied relatively to the indicating means when the indicating means operated, whereby the azimuth of the deviation may be determined.

3. In a well surveying instrument provided with means for indicating deviations of the instrument from the vertical, the combination of an element, means for delaying for a predetermined period the operation of the indicating means, a gas driven gyroscope connected to the element to insure the location of said element in a determinable azimuthal position during the operation of the indicating means, and means for maintaining the element, after the indicating means operates, in that position which it occupied relatively to the indicating means when the indicating means operated, whereby the azimuth of the deviation may be determined, said gyroscope being arranged to spin freely during the period preceding the operation of the indicating means while the instrument is in a well.

4. In a well surveying instrument provided with means for indicating deviations of the instrument from the vertical, the combination of an element, means for delaying for a predetermined period the operation of the indicating means, a gas driven gyroscope connected to the element to insure the location of said element in a determinable azimuthal position during the operation of the indicating means, means for supplying gas to maintain the gyroscope spinning during the period preceding the operation of the indicating means while the instrument is in a well, and means for maintaining the element, after the indicating means operates, in that position which it occupied relatively to the indicating means when the indicating means operated, whereby the azimuth of the deviation may be determined.

5. In a well surveying instrument provided with means for indicating deviations of the instrument from the vertical, the combination of an element, means for delaying for a predetermined period the operation of the indicating means, a gas driven gyroscope connected to the element to insure the location of said element in a determinable azimuthal position during the operation of the indicating means, means for supplying gas to maintain the gyroscope spinning during the period preceding the operation of the indicating means while the instrument is in a well, said gas supplying means including a motor driven pump, and means for maintaining the element, after the indicating means operates, in that position which it occupied relatively to the indicating means when the indicating means operated, whereby the azimuth of the deviation may be determined.

6. In a well surveying instrument provided with means for indicating deviations of the instrument from the vertical, the combination of an element, means for delaying for a predetermined period the operation of the indicating means, a gyroscope connected to the element to insure the location of said element in a determinable azimuthal position during the operation of the indicating means, and means for maintaining the element, after the indicating means operates, in that position which it occupied relatively to the indicating means when the indicating means operated, whereby the azimuth of the deviation may be determined, the last named means including operation delaying devices comprising a cylinder, a piston therein, a spring urging the piston in one direction, and means obstructing free flow of fluid from the cylinder in advance of the piston, operation depending upon advance of the piston to a predetermined position.

7. In a well surveying instrument provided with means for indicating deviations of the instrument from the vertical, the combination of means for delaying for a predetermined period the operation of the indicating means, a gyroscope comprising a rotor, a gimbal ring mounted on a normally horizontal axis and arranged to support said rotor, and a second gimbal ring mounted on a normally vertical axis and arranged to support the first gimbal ring, and means for holding the second gimbal ring, after the indicating means operates, in that position which it occupied relatively to the indicating means when the indicating means operated, whereby the azimuth of the deviation may be determined.

8. In a well surveying instrument provided with means for indicating deviations of the instrument from the vertical, the combination of means for delaying for a predetermined period the operation of the indicating means, a gyroscope comprising a rotor, a gimbal ring mounted on a normally horizontal axis and arranged to support said rotor, and a second gimbal ring mounted on a normally vertical axis and arranged to support the first gimbal ring, and means for holding the second gimbal ring, after the indicating means operates, in that position which it occupied relatively to the indicating means when the indicating means operated, whereby the azimuth of the deviation may be determined, the last named means acting to first clamp the second gimbal ring in said position, and then engage the first gimbal ring and hold it in its normal position.

9. In a well surveying instrument provided with means for indicating deviations of the instrument from the vertical, the combination of means for delaying for a predetermined period the operation of the indicating means, a gyroscope comprising a rotor, a gimbal ring mounted on a normally horizontal axis and arranged to support said rotor, and a second gimbal ring mounted on a normally vertical axis and arranged to support the first gimbal ring, and means for holding the second gimbal ring, after the indicating means operates, in that position which it occupied relatively to the indicating means when the indicating means operated, whereby the azimuth of the deviation may be determined, the last named means acting to first clamp the second gimbal ring in said position, and then engage the first gimbal ring and hold it in its normal position, said last named means serving to hold the gimbal rings while the rotor is being accelerated.

10. In a well surveying instrument provided with means indicating the deviation of the instrument from the vertical at a predetermined time while the instrument is within a bore hole, the combination of an element, a gyroscope connected to the element to insure the location of said element in a determinable azimuthal position at said predetermined time, and means for maintaining the element, after said predetermined time, in that position which it occupied relatively to the indicating means at said predetermined time, whereby the azimuth of the deviation may be determined.

GOTTDANK L. KOTHNY.
FREDERICK C. NARVESEN.